June 17, 1941.   W. A. McMORRIS   2,246,180
LIGHTNING ARRESTER
Filed Sept. 30, 1938

Inventor:
William A. McMorris,
by Harry E. Dunham
His Attorney.

Patented June 17, 1941

2,246,180

UNITED STATES PATENT OFFICE 2,246,180

LIGHTNING ARRESTER

William A. McMorris, Pittsfield, Mass., assignor to General Electric Company, a corporation of New York Application September 30, 1938, Serial No. 232,602

14 Claims. (Cl. 175—30)

My invention relates to lightning arresters, and its general object is to provide an improved arrester which will afford reliable protection against excessive transient voltages in either direct or alternating current electric circuits.

The usual arrester heretofore used includes a spark gap and a resistance and can be used for the protection of alternating current circuits only. An excessive transient voltage may cause the gap to spark over and permit a power follow current to be established through the arrester. Because of the alternating wave form of the applied power voltage, the follow current will pass through zero at the end of the first half cycle of the power frequency so that it may be interrupted by the gap. Such an arrester cannot function when applied to a direct current circuit because the follow current does not pass through zero and therefore cannot be interrupted by the gap. In accordance with the present invention, a tuned circuit is connected across a gap and arranged to force the current in the gap to pass through zero whether the applied power voltage is a direct voltage or an alternating voltage. When the gap is sparked over by an excessive transient voltage, an oscillatory circuit is completed through the gap and a local oscillation occurs in the tuned circuit which includes the gap. The oscillatory current in this circuit is superimposed upon the follow current drawn from the protected line and if the tuned circuit is properly proportioned, the resultant current through the gap is forced to pass through zero within less than a cycle of the resonant frequency. This permits the arc through the gap to be interrupted. The natural frequency of the oscillatory circuit may be made very high so that the current through the gap may be interrupted with great rapidity, the only limit being the time that it takes the gap to become deionized after the current through the gap reaches a zero value. By enclosing the gap in an extremely high vacuum, it has been found that the oscillatory circuit may have a natural frequency of at least 15,000 to 20,000 cycles per second. A further object of the invention is to provide an improved lighting arrester which will act so rapidly that little or no power current can follow a transient discharge through the arrester.

Figure 1:
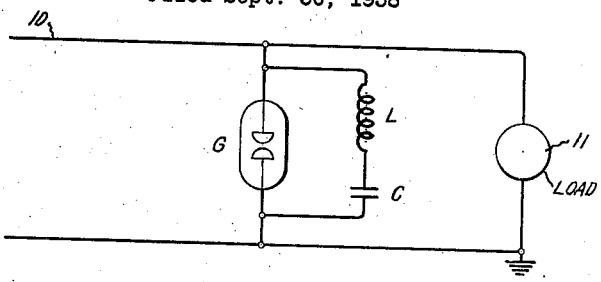
Figure 2:
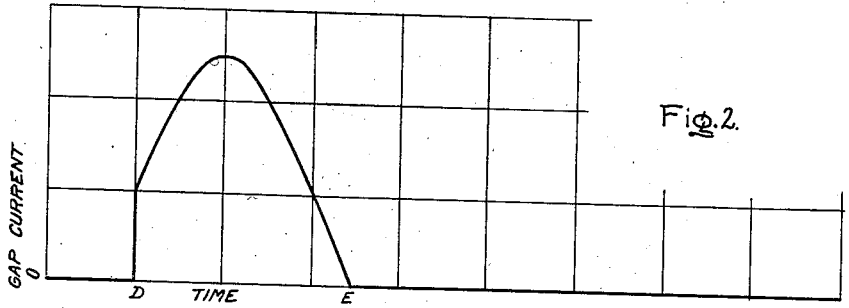
Figure 3:
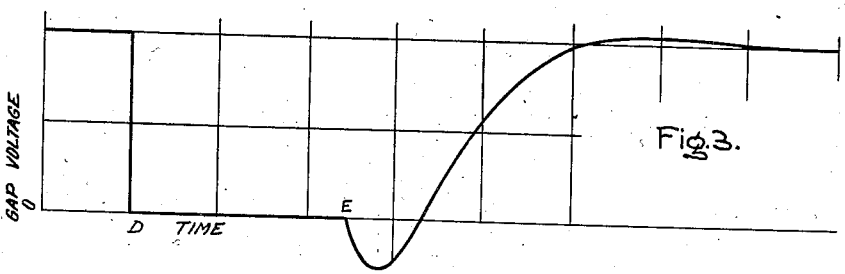
Figure 4:
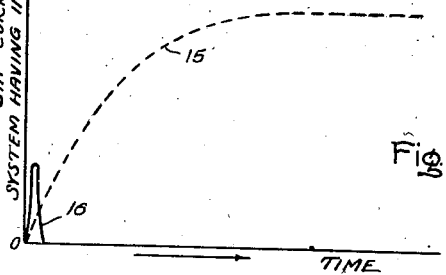

Further objects and advantages will appear from the following description taken in connection with the accompanying drawing, in which Fig. 1 is a diagrammatic view of an arrester arranged in accordance with the invention and connected to protect an electrical power circuit, and Figs. 2, 3 and 4 show explanatory voltage and current curves.

An arrester arranged in accordance with the invention as shown in Fig. 1 includes a spark gap G connected across an electrical power circuit 10 which supplies current to a load 11. An inductance L and a capacitor C are connected across the gap G and are so proportioned as to form a tuned circuit through the gap of relatively high natural frequency. When the gap G is sparked over by an excessive transient voltage in the power circuit 10, the gap G is short-circuited and thus completes the oscillatory circuit through the inductance L and the capacitor C. The capacitor C is of course normally charged by the voltage of the power circuit 10 so that a local oscillation occurs in the tuned or oscillatory circuit as soon as this circuit is completed through the gap G. If the inductance L and the capacitor C are properly proportioned, the oscillatory current which is superimposed upon the follow current drawn from the power circuit 10 will force the resulting current through the gap G to pass through zero within less than one cycle of the resonant frequency of the oscillatory circuit. The arc through the gap G is thus interrupted and cannot be reestablished if the gap G is deionized with sufficient rapidity. The arrester is not limited to the use of any particular form of gap G, but the magnitude of the current which may be interrupted successfully at any particular resonant frequency of the oscillatory circuit of course depends upon the characteristics of the gap. It has been found desirable to use vacuum gaps of the type disclosed in United States Patent No. 1,906,602, to Albert W. Hull, issued May 2, 1933, and assigned to the General Electric Company, because of their ability to interrupt heavy currents at very high frequencies.

The operation of the arrester shown in Fig. 1 will be described in more detail by referring to the voltage and current curves shown in Figs. 2, 3 and 4. It will at first be assumed that the electrical circuit 10 has no inductance and that its short circuit current is limited only by resistance. Any real power circuit of course has inductance but it will appear later that this inductance assists in the operation of the arrester so that the assumption that the circuit contains no inductance is a safe one. It will also be assumed for the present that the circuit 10 is a direct current circuit but it will appear later that the arrester will operate in connection with either a direct current or an alternating current circuit. Under normal operating conditions there is of course no current across the gap G and the voltage across this gap and across the capacitor C is that of the circuit 10. If a dangerously high transient voltage, such as may be produced by lightning, appears across the circuit 10, it will break down the gap G and the resulting arc or discharge across the gap will short-circuit the two sides of the power circuit 10. This short-circuit of the gap G will permit the current across the gap to rise instantly to a value determined by the voltage and resistance of the circuit 10, as indicated at the point D of Fig. 2. The arc across the gap G also completes the local oscillatory circuit including the inductance L and the capacitor C, the capacitor C being already charged to the voltage of the power circuit 10. An oscillatory current therefore is established through the gap G and this oscillatory current is superposed upon the short circuit current established by the voltage of the circuit 10. The resultant of the two currents therefore rises until it reached a maximum value indicated by the highest point of the curve shown in Fig. 2. The oscillatory current then reverses until it is flowing in the opposite direction and with sufficient magnitude to force the resultant current through the gap to disappear, as indicated by the point E of Fig. 2. This permits the gap to become sealed and prevent re-establishment of the discharge, providing the gap has time to become deionized before there is sufficient voltage to break it down again. There is thus no further current through the gap G after the resultant of the short circuit and oscillatory currents has reached a zero value indicated by the point E of Fig. 2. As shown in Fig. 3, the voltage across the gap G is that of the circuit 10 prior to the instant D of the breakdown of the gap. The transient discharge short-circuits the gap at the instant D so that the voltage across the gap is reduced to zero until the gap seals at the instant E. The voltage of the oscillatory circuit then appears across the gap and finally rises to that of the circuit 10, as indicated in Fig. 3. The voltage across the capacitor C is that of the circuit 10 prior to the instant D of the discharge. This voltage across the capacitor C then oscillates through the period of the operation of the arrester and finally again reaches the same voltage as that of the circuit 10. In order that the local oscillatory current may oppose the short circuit current in the gap G and force the resultant of these two currents to reach zero value, it is of course necessary that the maximum value of the oscillatory current be at least equal to that of the short circuit current. This is true, however, only in the event that the power system 10 has no inductance, as assumed. As it will be explained subsequently, the inherent inductance of any real power system enables the oscillatory circuit inductance and capacitance to be so proportioned that the oscillatory current is actually very much smaller than the system short circuit current and yet is thoroughly effective.

It has been assumed that the inductance L and the capacitor C are so proportioned that the oscillatory current will reach a maximum value 50% greater than that of the short circuit current so that there will be a safe margin to make it certain that the resultant current in the gap will reach a zero value. Thus, if K equal the ratio between the maximum value of the oscillatory current and the value of the short circuit current, then K will equal 1.5. Also, let $R_1$ equal the resistance of the power circuit 10, $R_2$ equal the resistance of the load 11, and $f$ equal the natural frequency of the local oscillatory circuit comprising the inductance L, capacitor C and gap G, then the capacity and inductance of the capacitor C and the inductance L may be determined from the following equations:

$$C = \frac{K}{2\pi f}\left(\frac{R_1+R_2}{R_1 R_2}\right) \text{ farads}$$

$$L = \frac{1}{2\pi f K}\left(\frac{R_1 R_2}{R_1+R_2}\right) \text{ henries}$$

It is usually desirable that the natural frequency $f$ of the local oscillatory circuit be as high as possible although it should not be so high that the gap G will not have time to become de-ionized and prevent re-establishment of the short circuit current after the discharge through the arrester has been extinguished.

It has been found desirable to use a gap enclosed in a high vacuum to prevent appreciable ionization of the gap during a discharge, a suitable type of gap being disclosed in the before mentioned Patent No. 1,906,602 to Albert W. Hull, issued May 2, 1933 and assigned to the General Electric Company. Increasing the frequency $f$ permits a smaller physical size of the inductance L and the capacitor C and consequently makes them less expensive. An increase in the frequency $f$ will also reduce the time necessary for the arrester to extinguish the short circuit current through the gap.

The operation of the arrester has been explained with the assumption that there was no inductance in the power circuit 10. Any real power circuit of course has inductance and this inductance will prevent the short circuit current from rising instantly to its full value when the gap is broken down by transient voltage. The short circuit current may therefore be extinguished by the local oscillatory current before it reaches so large a value as it would if there were no inductance. In fact, and as borne out by actual tests, the gap discharge will be extinguished with such rapidity that the follow current will have an opportunity to build up to only a very small fraction of its normal short circuit value. This is clearly illustrated in Fig. 4, in which the dotted curve 15 approximates the rate of current increase across a gap following a breakdown thereof by a transient voltage condition. Due to the inductance of the power circuit, and hence its relatively long time constant as regards the time period of the high frequency oscillatory circuit, the gap current will rise relatively gradually until it assumes its normal short circuit value. At the first instant of the gap breakdown the oscillatory circuit will be completed and the full oscillatory current, indicated by curve 16, will be first superimposed upon the gap current in an additive relation during the first quarter cycle of the oscillatory current frequency and during the next half cycle, the oscillatory current will flow in opposition to the gap current. At the instant that the resultant current flowing through the gap is zero, the arc will be extinguished due to the high speed dielectric strength recovery characteristic of the gap. In actual tests in which the tuned circuit had a resonant frequency of 18,800 cycles per second, the duration of the follow current was less than one cycle of this frequency, or, approximately 0.000053 second. Both the duration and amplitude of the follow current are thus so greatly reduced that for all practical purposes it may be said that the follow current has been entirely eliminated. It is obvious, therefore, that in order to make the resultant current in the gap reach zero, the crest current in the oscillation need only be a small fraction as great as the normal maximum value of the short circuit current if the resonant circuit were not present. The capacitance and the inductance should be proportioned so that the crest value of the oscillatory current will be a safe value, such as 50%, greater than the gap current at any time during the period of the first cycle of the oscillatory current.

The operation of the arrester has been explained as applied to a direct current circuit but it will operate in a similar manner when applied to an alternating current circuit. With the frequency $f$ of the order of 10,000 to 20,000 cycles per second and a power frequency of 60 cycles per second, an operation of the arrester occurring near a crest of the 60 cycle power voltage wave will be all over before the power voltage has changed appreciably so that the alternating nature of the power voltage will have no appreciable effect upon the operation of the arrester. If the gap G should be broken down by a transient voltage when the alternating circuit voltage is at a value at or near zero, then no follow current will be established so as to require the oscillatory circuit to operate. If the break-down of the gap G should occur at any point of the power voltage wave when the power voltage is sufficient to establish a follow current through the gap, then there is necessarily a charge available in the capacitor C to force the resultant gap current to reach zero value and therefore the desired result that the discharge through the arrester be extinguished. If the inductance L and capacitor C are so proportioned that the natural frequency $f$ of the local oscillatory circuit is sufficiently high, it has been found that the arrester will operate so rapidly that very little or no power follow current can occur through the arrester.

The invention has been explained by describing and illustrating a particular form thereof and its application to both direct and alternating current circuits, but it will be apparent that changes may be made without departing from the spirit of the invention and the scope of the appended claims.

What I claim as new and desire to secure by Letters Patent of the United States is:

1. A lightning arrester for protecting an electrical power circuit having inductance, said arrester including a gap, and an oscillatory circuit connected across the gap to extinguish a power short circuit current through said gap before said short circuit current can reach its normal maximum value.

2. A lightning arrester for protecting an electrical power circuit having inductance, said arrester including a gap, and an inductance and a capacitor connected across said gap, said inductance and capacitor being proportioned to provide an oscillatory circuit through the gap to extinguish a power short circuit current through said gap before said short circuit current can reach its normal maximum value.

3. A lightning arrester for protecting an electrical power circuit having inductance, said arrester including a gap enclosed in a high vacuum to prevent appreciable ionization of the gap, and an oscillatory circuit connected across the gap to extinguish a power short circuit current through said gap before said short circuit current can reach its normal maximum value.

4. A lightning arrester for protecting an electrical power circuit having inductance, said arrester including a gap enclosed in a high vacuum to prevent appreciable ionization of the gap, and an inductance and a capacitor connected across said gap, said inductance and capacitor being proportioned to provide a high frequency oscillatory circuit through the gap to extinguish a power short circuit current through said gap before said short circuit current can reach its normal maximum value.

5. A lightning arrester for protecting an electrical power circuit having inductance, said arrester including a gap enclosed in a high vacuum to prevent appreciable ionization of the gap, and an inductance and a capacitor connected across said gap, said inductance and capacitor being proportioned to provide an oscillatory circuit through the gap of such high natural frequency as to extinguish a power short circuit current through the gap before said short circuit current can reach its normal maximum value.

6. A lightning arrester including a gap, an inductance and a capacitor connected across said gap, said inductance and capacitor being proportioned to provide a high frequency oscillatory circuit through the gap, and means for maintaining a constant voltage across said capacitor to provide an oscillatory current through the gap upon the occurrence of a discharge through the gap.

7. The combination with an electric circuit, of a lightning arrester connected to ground from a point of said circuit normally maintained at a potential different from that of ground, said lightning arrester including a gap, and a high frequency oscillatory circuit connected across said gap.

8. The combination with an electric circuit, of a lightning arrester connected to ground from a point of said circuit normally maintained at a potential different from that of ground, said lightning arrester including a gap, and an inductance and a capacitor connected across said gap, said inductance and capacitor being proportioned to provide a relatively high frequency oscillatory circuit through the gap, whereby said capacitor will be constantly charged to provide an oscillatory current through the gap upon occurrence of a discharge through the gap.

9. The combination with an electric power circuit, of a protective means therefor comprising a discharge gap characterized by its ability to recover rapidly its dielectric strength following a discharge therethrough and arranged to discharge an overvoltage occurring between two points of said circuit which are at different potentials under normal operation of said circuit, a high frequency oscillatory circuit including inductance in series relationship with capacitance arranged to have said capacitance normally charged from said circuit and discharged by an oscillatory current through said gap when said gap is short circuited by a discharge thereacross, the time period of recovery of the dielectric strength of said gap following the occurrence of the discharge of said oscillatory current through said gap being a small fraction of the time period of said oscillatory circuit.

10. The combination with a power circuit having inductance, of a protective means therefor comprising a discharge gap connected between said circuit and ground, said discharge gap being of a type having a relatively rapid dielectric strength recovery characteristic, an oscillatory circuit including inductance in series relationship with capacitance connected across said gap, said inductance and capacitance being proportioned so that the time period of said oscillatory circuit is substantially greater than the recovery period of said gap and less than the time required for the follow current across said gap to build up to normal maximum value whereby an arc occurring across said gap is extinguished by the current of said oscillatory circuit before said gap current can reach its normal maximum value.

11. The combination with an electric circuit having reactance, of a protective means therefor comprising a discharge gap connected between said circuit and ground, said discharge gap being of a type having a relatively rapid dielectric strength recovery characteristic, an oscillatory circuit including an inductance and a capacitance in series relationship connected across said gap, said inductance and capacitance being proportioned so that the crest value of the current in said oscillatory circuit is larger than the system follow current through said gap after breakdown during the first cycle of the oscillation, whereby the follow current is interrupted in the gap during the time period of said oscillatory circuit.

12. The combination with an electric circuit having a relatively long time constant, of a protective means therefor comprising a discharge gap connected between said circuit and ground, said discharge gap having a relatively rapid dielectric strength recovery characteristic, an oscillatory circuit including an inductance in series relationship with capacitance arranged to have said capacitance normally charged from said circuit and discharged by an oscillatory current through said gap when said gap is short circuited by a discharge occurring thereacross, the frequency period of said oscillatory circuit being substantially greater than the recovery period of said discharge gap and substantially less than the time constant of said electric circuit.

13. The combination with an electric circuit having reactance, of a protective means therefor comprising a discharge gap connected between said circuit and ground, said discharge gap being of a type having the property to recover rapidly its dielectric strength following a discharge therethrough, an oscillatory circuit including inductance in series relationship with capacitance arranged to have said capacitance normally charged from said circuit and discharged by an oscillatory current through said gap when said gap is short circuited by a discharge thereacross, said inductance and said capacitance being so proportioned that the crest value of the oscillatory current will be greater than the follow current through the gap for a period following the initiation of follow current flow at least equal to the period of said oscillatory current.

14. The combination with an electric circuit having reactance, of an overvoltage protective means therefor comprising a gap enclosed in a high vacuum to prevent appreciable ionization of the gap, and an inductance and a capacitor connected in series relation across said gap, said inductance and capacitor being so proportioned as to provide an oscillatory circuit through said gap upon breakdown thereof, the time period of the oscillations in said oscillatory circuit being greater than the recovery period of said gap but less than the period required for the follow current to build up to normal short circuit value.

WILLIAM A. McMORRIS.